(12) United States Patent
Lan

(10) Patent No.: US 8,060,106 B1
(45) Date of Patent: Nov. 15, 2011

(54) METHOD AND SYSTEM FOR ACQUISITION OF A SERVICE PROVIDER COMMUNICATIONS NETWORK BY A MOBILE COMMUNICATIONS DEVICE

(75) Inventor: Wei-Ming Lan, Morrisville, NC (US)

(73) Assignee: Nextel Communications Inc., Reston, VA (US)

( * ) Notice: Subject to any disclaimer, the term of this patent is extended or adjusted under 35 U.S.C. 154(b) by 1049 days.

(21) Appl. No.: 11/678,540

(22) Filed: Feb. 23, 2007

(51) Int. Cl.
*H04W 74/00* (2009.01)
*H04W 4/00* (2009.01)
*H04B 7/00* (2006.01)

(52) U.S. Cl. .......... 455/455; 455/434; 455/513
(58) Field of Classification Search .......... 455/434, 455/455, 574
See application file for complete search history.

(56) References Cited

U.S. PATENT DOCUMENTS

| | | | | |
|---|---|---|---|---|
| 5,722,078 | A * | 2/1998 | Przelomiec et al. | 455/434 |
| 6,343,070 | B1 * | 1/2002 | Klas et al. | 370/329 |
| 6,400,948 | B1 * | 6/2002 | Hardin | 455/434 |
| 6,992,997 | B1 * | 1/2006 | Refai et al. | 370/329 |
| 2001/0044301 | A1 * | 11/2001 | Moore | 455/429 |
| 2004/0180656 | A1 * | 9/2004 | Stephan et al. | 455/434 |
| 2004/0203839 | A1 * | 10/2004 | Ostberg et al. | 455/455 |
| 2006/0172747 | A1 * | 8/2006 | Mohammed | 455/458 |
| 2006/0199582 | A1 * | 9/2006 | Giacalone | 455/434 |
| 2010/0002611 | A1 * | 1/2010 | Umatt et al. | 370/311 |

FOREIGN PATENT DOCUMENTS

EP 951189 A2 * 10/1999

* cited by examiner

*Primary Examiner* — Nick Corsaro
*Assistant Examiner* — Tangela T. Chambers

(57) ABSTRACT

A method and system for acquisition of a service provider communications network by a mobile communications device is disclosed. In accordance with an embodiment of a method of the present invention, the method includes storing a control channel designation in a database in the mobile communications device and accessing the control channel designation from the database by the mobile device. The service provider communications network is acquired by the mobile communications device through a control channel associated with the control channel designation accessed from the database. In accordance with an embodiment of a system of the present invention, the system includes the mobile communications device with the database. A control channel designation is stored in the database. The mobile communications device accesses the control channel designation from the database and acquires the service provider communications network through a control channel associated with the control channel designation accessed from the database.

10 Claims, 3 Drawing Sheets

METHOD AND SYSTEM FOR ACQUISITION OF A SERVICE PROVIDER COMMUNICATIONS NETWORK BY A MOBILE COMMUNICATIONS DEVICE

FIELD OF THE INVENTION

The present invention relates generally to the field of telecommunications, and in particular to acquisition of a service provider communications network by a mobile communications device.

BACKGROUND OF THE INVENTION

As is known, the use of cell phones is becoming increasingly popular. One drawback with the operation of known cell phones is the time required to acquire the service provider communications network when powering up in any particular cell. This can present drawbacks. For example, the user is required to wait until the network is acquired before being able to utilize the phone for communications. Even though this may not require a great amount of time, in view of today's fast paced world and general impatience of the population, this can present an inconvenience. Additionally, any time required for acquisition of the network utilizes available battery life that could otherwise be used by the user for communicating with the phone.

Currently, in acquiring the service provider network when powering up, the mobile communications device must scan through a large number of control channels in a bandmap to acquire the one channel that is assigned to the cell/sector in which the phone is located when powering up. The phone sequentially scans the bandmap to find the channel of the cell in which the phone is located. This can present delays and inefficiencies in the powering up process.

For example, assume that there are 200 control channels in the network numbered 1 through 200 in the bandmap. Further assume that the phone is located in a cell that is serviced by control channel number 200. If it takes an average of 0.40 seconds to scan each control channel in the bandmap, a total time of 80 seconds will be required (0.40 seconds×200 channels) for the phone to sequentially scan the bandmap before it finds channel number 200. Thus, at least 80 seconds is required before the phone can acquire the network with channel number 200. As discussed above, this is inefficient and can be inconvenient.

Therefore, it would be desirable to provide an improved method and system for acquisition of a service provider communications network by a mobile communications device.

SUMMARY OF THE INVENTION

In accordance with an embodiment of a method of the present invention, a method for acquisition of a service provider communications network by a mobile communications device is provided. The method includes storing a control channel designation in a database in the mobile communications device and accessing the control channel designation from the database by the mobile communications device. The service provider communications network is acquired by the mobile communications device through a control channel associated with the control channel designation accessed from the database.

In accordance with an embodiment of a system of the present invention, the system includes the mobile communications device with the database. A control channel designation is stored in the database. The mobile communications device accesses the control channel designation from the database and acquires the service provider communications network through a control channel associated with the control channel designation accessed from the database.

DETAILED DESCRIPTION OF THE EXEMPLARY EMBODIMENTS

Figure 1:
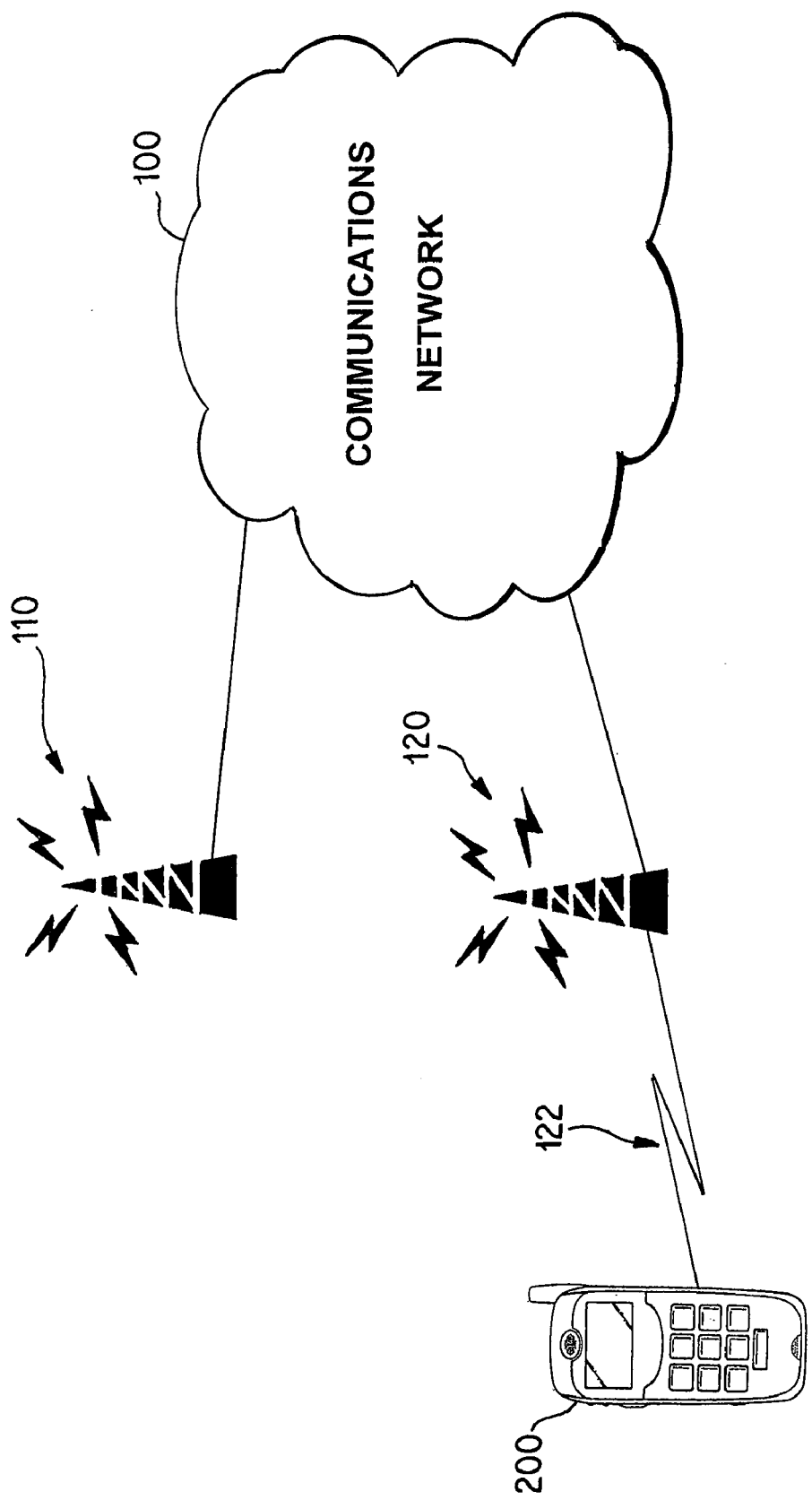
FIG. 1 illustrates an embodiment of service provider network and a mobile communications device in communication with the network.

FIG. 1 illustrates an embodiment of an exemplary service provider communications network 100 and a mobile communications device 200 in communication with the network. In the exemplary embodiment, the communications network 100 is the Integrated Digital Enhanced Network (iDEN) as provided by service provider Sprint Nextel and Motorola. The iDEN network 100 provides a variety of different types of communication services to subscribers of the network. Thus, the communications network may provide dispatch calling services, interconnect calling services, and data communications services. As is known, a dispatch call is a half-duplex call and is commonly known as a "walkie-talkie", or push-to-talk (PTT), type of call. As discussed above, iDEN communications network 100 may also provide interconnect calls, which are commonly known as regular cell phone calls. iDEN network 100 may also provide data services, such as text messages and internet applications.

As is known, when a mobile communications device 200 communicates with network 100, the device communicates with the network through a cell of the network. Network 100 includes many cells, two of which are illustrated in FIG. 1 as cells 110 and 120. In FIG. 1, mobile communications device 200 is communicating with network 100 through cell 120 over a control channel 122. Each cell includes a different control channel(s) from other cells. Thus, as can be understood, when a network user travels through different geographic areas that are serviced by the network, the mobile communications device of the user utilizes control channels associated with the different geographic areas and respective cells.

As discussed previously, as currently known, when the mobile communications device powers up in any particular geographic area, and thus in any particular cell, in order to acquire the network 100 over the control channel that services that cell, the mobile communications device sequentially scans through the large number of control channels in the bandmap until the one channel that is assigned to the cell/sector in which the phone is located is determined. This can present drawbacks.

Thus, in accordance with the principles of the present invention, the mobile communications device is provided with a database that stores the most recently utilized control channels. When powering up, the mobile communications device scans this more limited list of recently used channels. Since it is likely that the user will be powering up in a cell that was recently used, the device will be able to quickly obtain the control channel of the cell it is in from the list of recently used channels. This provides a more efficient system and method for acquiring the communications network than the known process of sequentially scanning a list of control channels without respect to prior usage.

Figure 2:
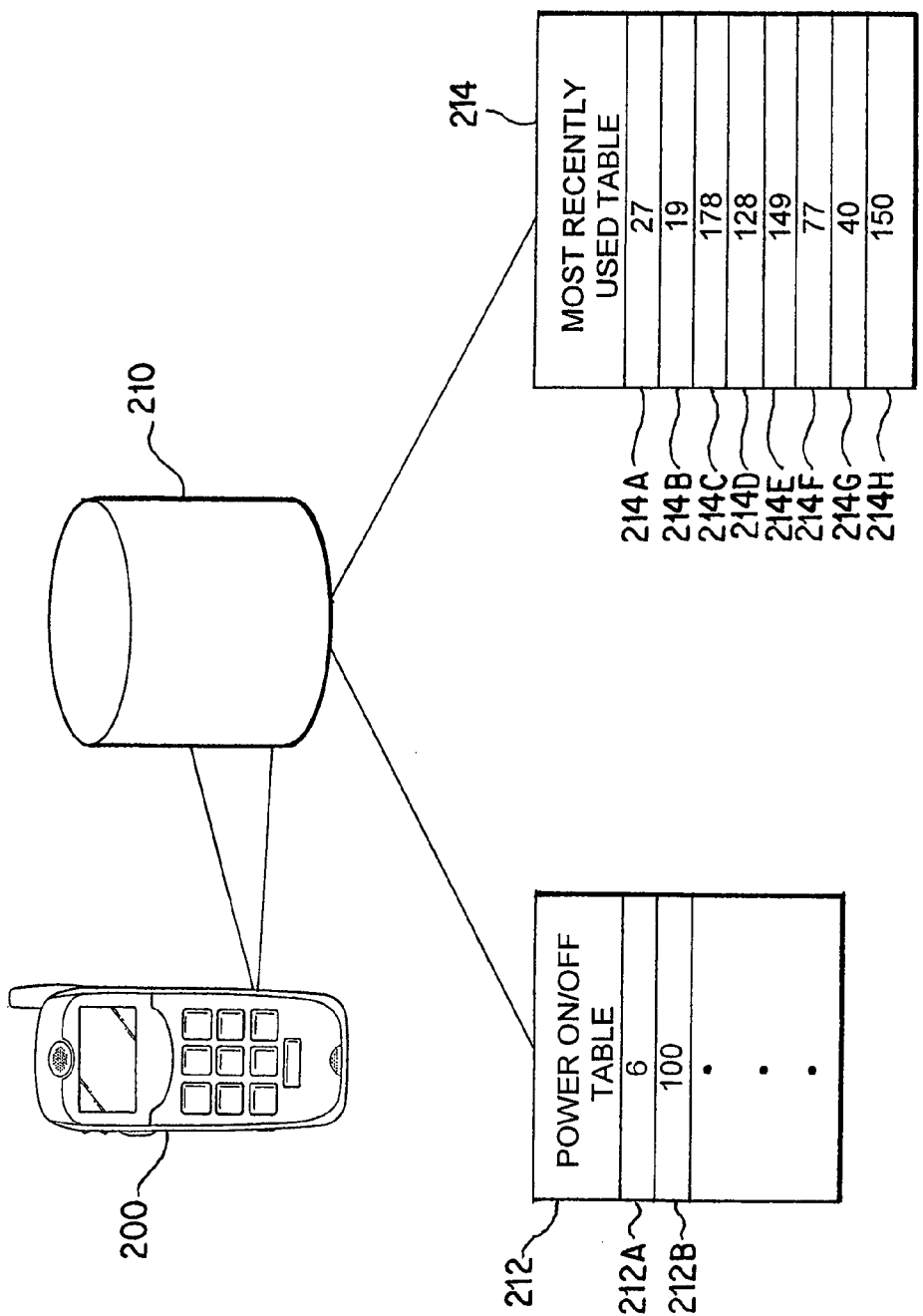
FIG. 2 illustrates an embodiment of control channel tables in accordance with the principles of the present invention.

As discussed above, mobile communications device 200 includes a database that includes a list of recently used control channel designations that are associated with respective control channels. As can be seen in FIG. 2, device 200 includes database 210. In database 210, tables 212 and 214 may be maintained. The first table 212 may be a power on/off table. This table maintains a listing of the control channel designations that the mobile communications device last used when powering up and powering down. As such, as can be seen, most recently used power down control channel designation number 6 is stored in the first field 212A of table 212 and most recently used power up control channel designation number 100 is stored in the second field 212B of table 212. Additional power down and power up control channel designations can also be stored in table 212 for processes prior to the most recent power up/power down process. Of course, if the device powered up and down with the same control channel, only one designation would be listed in table 212 for this process. Table 212 will be further discussed below in connection with an exemplary use of the system and method of the present invention.

The second table 214 may be a most recently used table. This table maintains a listing of the control channel designations that the mobile communications device last used between a powering up and powering down process when the device was communicating with the network 100 over the control channels associated with the various cells of the network as the device was traversing these cells. Of course, if the device did not traverse cells, or did not utilize a different control channel from the powering up or powering down channel, this table would not include entries for the respective powering up/powering down process. For each powering up/powering down process listed in table 212, the associated channels used between the powering up and powering down process are listed in table 214 in sequence of use order. As such, as can be seen in table 214, between the powering up and powering down process listed in table 212, control channel designations 214A-214H were used by the mobile communications device.

In further describing database 210, tables 212 and 214, and the method and system in accordance with the principles of the present invention, the following exemplary use case is provided. Assume that there are 200 control channels, numbered 1 through 200, associated with network 100. A brand new, out of the box, mobile communications device powers up in a cell of the network with control channel 100. The mobile communications device then travels with the user and moves through cells of the network in sequence with control channels 150, 40, 77, 149, 128, 178, 19, and 27. Eventually, the mobile device powers down in the cell with control channel 6. First of all, because the mobile device is new out of the box, the phone will take 40 seconds (0.40 seconds×100) to sequentially scan the full spectrum of control channels before it acquires control channel number 100.

After the device powers down, the mobile communications device will store the control channels used in database 210 and tables 212 and 214. Thus, as shown in FIG. 2, table 214 will list control channels 27, 19, 178, 128, 149, 77, 40, and 150. The control channels are prioritized in the listing sequence in table 214 in the order in which they were last used by the communications device. Thus, control channel 27 is listed first in the table since it was the last control channel used by the device before it powered down. For a newly acquired channel with a duplicate entry in the table, the duplicate entry will be deleted while keeping the newly acquired channel in its sequence listing with respect to the other newly acquired channels.

The device also populates power on/off table 212 with the control channels that were used by the device when powering up and down. Thus, as can be seen, table 212 includes channel number 6 first in the sequence listing and channel number 100 second. Since the power down control channel, i.e., channel 6, was the last power up/down channel used by the mobile device, this last used power down channel is listed first.

As discussed above, channels should not be duplicated in the each of the two tables or between the two tables. So, for example, if the mobile powers up at a cell with control channel 6, then travels through a sequence of cells and then back through the cell with channel 6, the control channel 6 will already be listed in table 212 and will not be added to table 214. Conversely, if the mobile powers down in a cell whose control channel is already in table 214 but not in table 212, the entry for this channel in table 214 will be deleted and the channel will be added to table 212. Therefore, if a control channel is already listed/should be listed in table 212, it will not be listed in table 214.

When the mobile communications device powers up again, the device builds a scan list from the entries in tables 212 and 214. Thus, the scan list is built from the control channels most recently used by the device. This is advantageous because since most people tend to power up and down their mobile device at a few number of locations, e.g., home, airport, school, work, conference center, etc., by first scanning the recently used channels when powering up, this can reduce the amount of time to acquire the network. This is so because it is likely the power up control channel is likely to be one of the most recently used channels.

Continuing, as discussed above, the mobile device will build a scan list from the control channels most recently used by the device, which are those in tables 212 and 214, in powering up/down process order sequence. Thus, the scan list will include, in sequence order, 6, 100, 27, 19, 178, 128, 149, 77, 40, 150, and then the rest of the 200 channels in sequence in the bandmap. The mobile device will then start its scan based on the control channels in the scan list starting with channel 6, i.e., the most recent power down channel. In this example, assume that the mobile communications device is still in the cell/sector with channel 6 when it powers up. Since this channel is on the top of the scan list, it will be the first channel with which the device will try to acquire the network. In this circumstance, it will only take 0.40 seconds (0.40 seconds per channel×one searched channel) for the device to acquire the network. Similarly, if the device powers up in, for example, channel 150, since this is the 10th channel in the built scan list, it will only take 4 seconds (0.40 seconds per channel×10 searched channels) to acquire the network. Without the present invention, as can be understood, because the device would sequentially scan the bandmap of 200 channels, the device would take 2.4 seconds (0.40 seconds per channel×6 channels) to acquire channel 6 and 60 seconds (0.40 seconds per channel×150 channels) to acquire channel 150. Thus, with the present invention, the scan time to acquire a control channel can be significantly reduced and become more consistent from power up to power up process.

In accordance with an embodiment of the present invention, tables 212 and 214 can be limited in the number of entries allowed for each table. For example, table 212 can be limited to 20 entries and table 214 can be limited to 50 entries. In this embodiment, only the 20 and 50 most recently used channels will be listed in tables 212 and 214, respectively.

Any other channels will be dropped from the tables. It may be advantageous to drop the most distantly used channels from the tables since it may be unlikely that the mobile will still be in the cell/sector of these distant channels when next powering up. In this embodiment, if the cell phone doesn't acquire the network through the limited list of channels in the tables when powering up, the phone will scan the rest of the channels in sequence in the bandmap.

Figure 3:
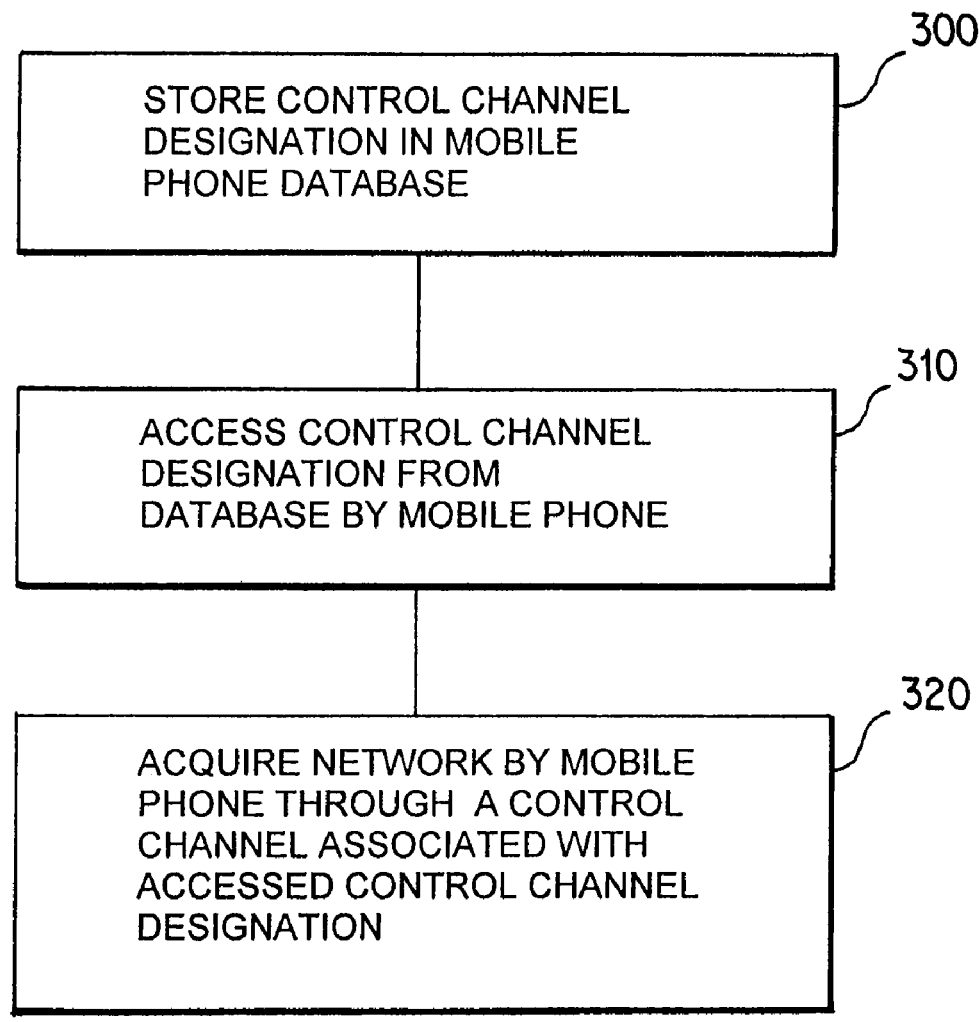
FIG. 3 illustrates an embodiment of a method for acquisition of the service provider network by the mobile communications device in accordance with the principles of the present invention.

FIG. 3 illustrates a method of the present invention. As can be seen, in step 300 a control channel designation is stored in the mobile phone's database. In step 310, the control channel designation is accessed from the database by the mobile phone. In step 320, the network is acquired by the mobile phone through a control channel associated with the accessed control channel designation.

As can be understood, whereas the mobile communications device is disclosed as a cell phone in an embodiment, the present invention can be practiced with any type of mobile communications device that must acquire a service provider communications network, e.g., a wireless PDA or smartphone. Further, the present invention is not limited to any particular format for tables 212 and 214. Additionally, two tables are not required. The power on/off and most recently used tables can be combined into a single table as long as the above described functionality can be achieved.

The disclosed embodiments are illustrative of the various ways in which the present invention may be practiced. Other embodiments can be implemented by those skilled in the art without departing from the spirit and scope of the present invention.

What is claimed is:

1. A method for acquisition of a service provider communications network by a mobile communications device, comprising the steps of:
   storing a plurality of control channel designations in a database in the mobile communications device in a sequence of: a power down control channel designation, a power up control channel designation, and additional control channel designations in a last-used-to-first-used sequential order in which control channels associated with the control channel designations are used by the mobile communications device to communicate with the communications network;
   accessing the control channel designations from the database by the mobile communications device in the sequence and scanning the associated control channels in the sequence; and
   acquiring the service provider communications network by the mobile communications device through the first available control channel associated with one of the control channel designations accessed from the database.

2. The method of claim 1, wherein the associated control channels were used by the mobile communications device when communicating with the service provider communications network in a cell of the network.

3. The method of claim 1:
   wherein the first control channel designation in the sequence is associated with a control channel used by the mobile communications device when powering down; and
   wherein the second control channel designation in the sequence is associated with a control channel used by the mobile communications device when powering up.

4. The method of claim 3:
   wherein the power up and power down control channel designations are stored in a first table in the database.

5. The method of claim 4, wherein the additional control channel designations are stored in a second table in the database.

6. A system for acquisition of a service provider communications network, comprising:
   a mobile communications device, comprising a database wherein a plurality of control channel designations are stored in a sequence of: a power down control channel designation, a power up control channel designation, and additional control channel designations in a last-used-to-first-used sequential order in which control channels associated with the control channel designations are used by the mobile communications device to communicate with the communications network;
   wherein the mobile communications device accesses the control channel designations from the database in the sequence and scans the associated control channels in the sequence;
   and wherein the mobile communications devices acquires the service provider communications network through the first available control channel associated with one of the control channel designations accessed from the database.

7. The system of claim 6, wherein the associated control channels were used by the mobile communications device when communicating with the service provider communications network in a cell of the network.

8. The system of claim 6:
   wherein the first control channel designation in the sequence is associated with a control channel used by the mobile communications device when powering down; and
   wherein the second control channel designation in the sequence is associated with a control channel used by the mobile communications device when powering up.

9. The system of claim 6:
   wherein the bower up and power down control channel designations are stored in a first table in the database.

10. The system of claim 9, wherein the additional control channel designations are stored in a second table in the database.

* * * * *